(No Model.) 2 Sheets—Sheet 1.
G. S. SCHUCHMAN.
CENTRAL DRAFT GLASS LAMP.
No. 361,723. Patented Apr. 26, 1887.
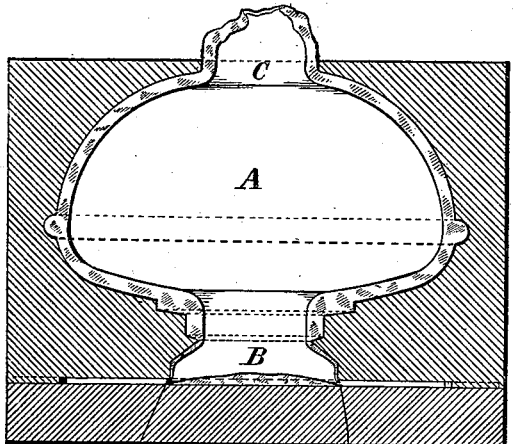
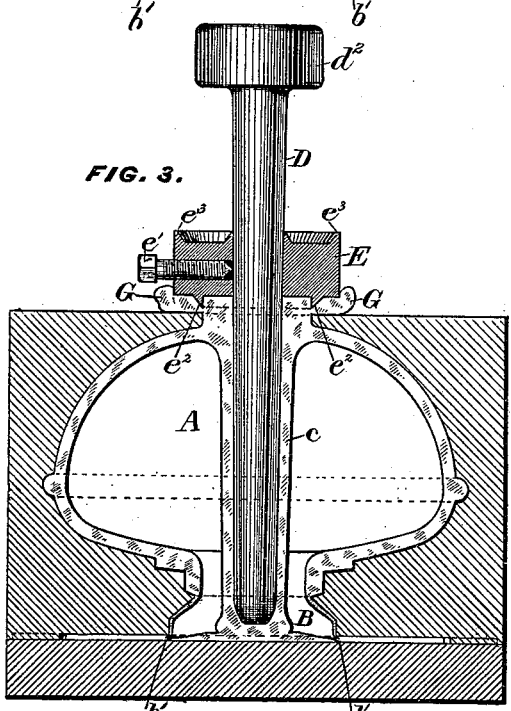
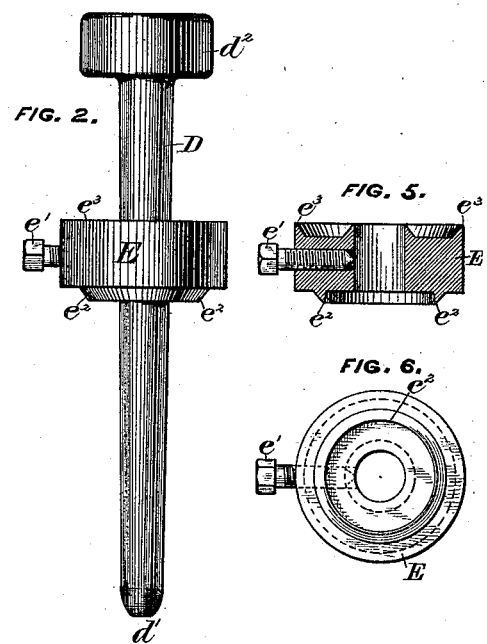
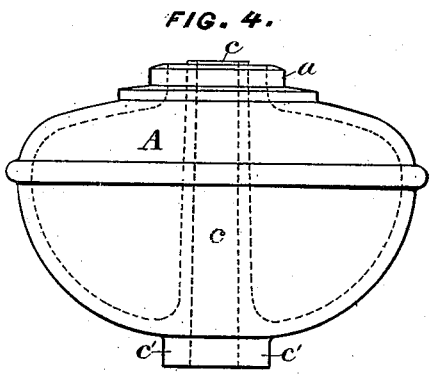
WITNESSES.
James H Bakewell
H. L. Gill.
INVENTOR.
George S. Schuchman
by Bakewell & Kerr
his Attorneys

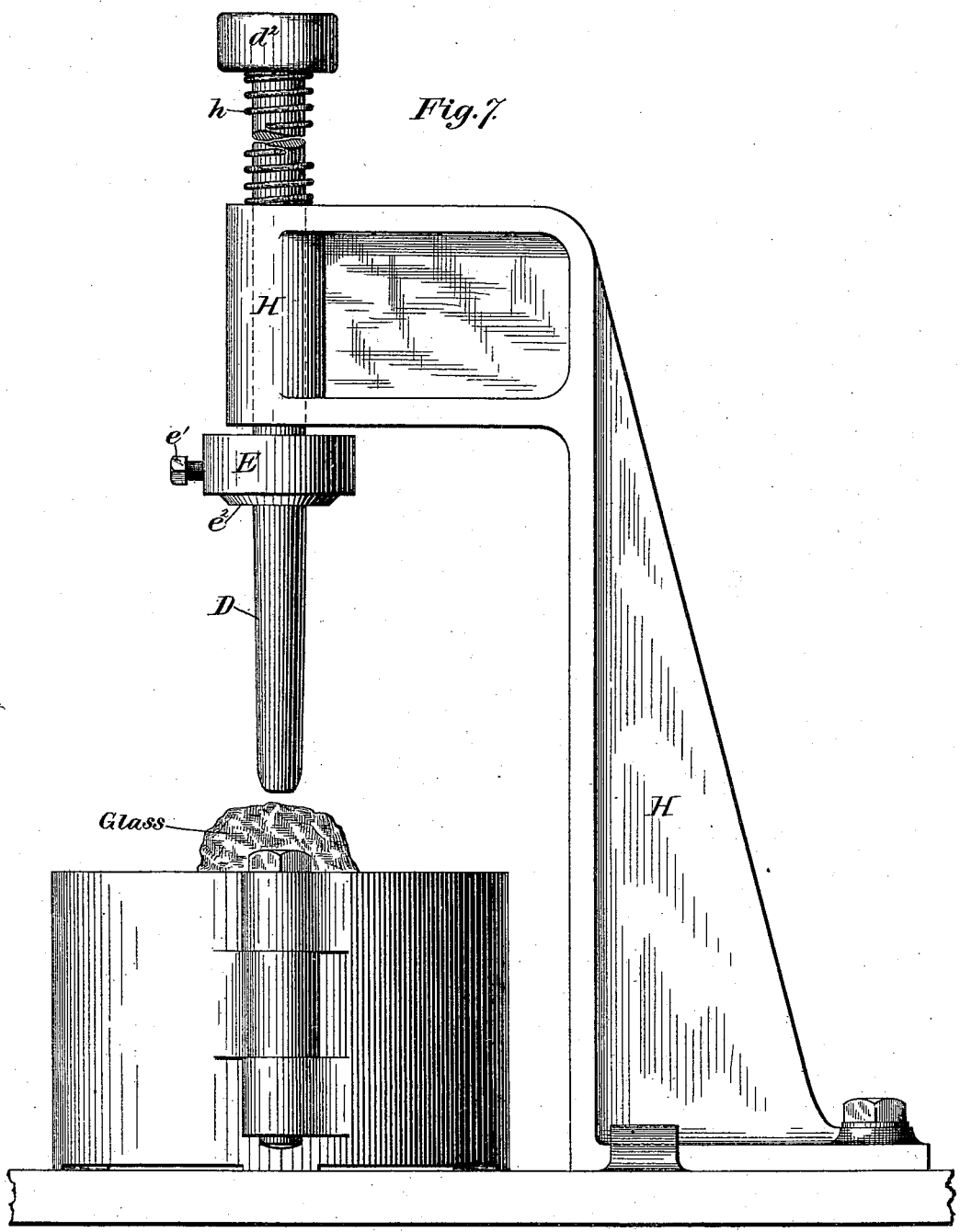

UNITED STATES PATENT OFFICE.

GEORGE S. SCHUCHMAN, OF PITTSBURG, PENNSYLVANIA.

CENTRAL-DRAFT GLASS LAMP.

SPECIFICATION forming part of Letters Patent No. 361,723, dated April 26, 1887.

Application filed December 8, 1886. Serial No. 220,963. (No model.)

*To all whom it may concern:*

Be it known that I, GEORGE S. SCHUCHMAN, of Pittsburg, in the county of Allegheny and State of Pennsylvania, have invented a new and useful Improvement in the Manufacture of Central-Draft Glass Lamps; and I do hereby declare the following to be a full, clear, and exact description thereof.

Heretofore in making central-draft lamps with a glass fount and a glass draft-tube two methods have been employed. In the first the fount is blown, and while it is yet hot a cylindrical mold is inserted and a tube is blown therein which adheres to the glass of the fount. In the second the fount is blown in a mold at the base of which is a plunger, which is caused to rise inside the fount when the latter is being blown, so that the glass shall be blown over and around the plunger, and shall thus constitute the tube.

My invention relates to an improvement somewhat analogous to the latter process, and is designed to remedy certain defects therein existing, by reason of which it has been practically impossible in this manner to form tubes of uniform size and strength.

In the accompanying drawings, Figure 1 represents a sectional elevation of a lamp in the particular kind of mold used by me in this process. Fig. 2 represents the pin or plunger. Fig. 3 represents a sectional elevation of the lamp and mold after the insertion of the plunger. Fig. 4 represents a complete lamp fount and draft-tube. Fig. 5 is a vertical diametrical section of the disk E, forming part of the plunger. Fig. 6 is a plan view of the face of the disk. Fig. 7 is a side view of the mold, the plunger, and its supporting-standard, showing a lump of plastic glass on the blow-over ready to be pressed down by the plunger D.

Like letters of reference indicate like parts in each of the figures.

My method consists in first forming the body of the lamp in a suitable mold, and subsequently inserting the draft-tube by forcing a quantity of hot plastic glass within the lamp by means of a plunger, which gives it the desired form.

It also consists in certain other subordinate steps.

The molds generally in use for blowing lamps (not central-draft lamps) are provided with a metal plate at the bottom, so as to form the base of the lamp, and no overblow is permitted except at the mouth of the mold. I employ a mold in which this plate is removed, so that it is hollow throughout, and when the glass is blown in there is an overblow at the bottom of the mold into a chamber below the mold. The mold is placed loosely on a marver or table, so that the overblow takes the form of a vertical elongation of the lamp, closed at the bottom by a flat plate of glass. Another effect of the mold being loosely placed on the marver when the lamp is blown is that the air forces its way out through the glass at various points between the mold and the marver, and leaves thereby apertures between the bottom and sides of the overblow.

Fig. 1 shows the lamp at the first stage of the process after the glass has been blown into the mold.

A is the body or fount of the lamp; B, the overblow at the base; $b'\,b'$, the air-holes formed in blowing; C, the neck into which the blowing-tube is inserted. If desired, the mold at the base of the chamber B may be closed and suitable air-escape passages provided.

The lamp is now ready for the insertion of the draft-tube. In this operation I employ the pin or plunger D. (Shown in Figs. 2 and 7.) As shown in the latter figure, the plunger is supported concentrically with the mold cavity by a standard, H, wherein it is upheld by a spring, $h$. The standard is pivoted at $h'$, so that it may be turned out of the way of the workman while he is blowing the lamp-fount. This plunger tapers slightly toward its end $d'$ to permit its withdrawal from the cooling glass, and is provided with a handle, $d^2$, and a movable disk, E. The disk E is adapted to move upon the pin D and to be adjusted at any desired point by means of the set-screws $e'$. On its under surface is formed an annular cutting-flange, $e^2$, concentric with but having a shorter radius than the disk E, and slightly tapering on its outer surface.

To form the draft-tube I place on the blow-over formed at the foot of the blow-pipe and on the top of the lamp, which is still hot and in the mold, a quantity of hot plastic glass, through which I then force the plunger D concentrically with the lamp A toward the base of the mold. The plunger carries with it the plastic glass to the bottom of the mold, giving it in its passage the form of a tube. At the bottom of the mold the glass unites in one piece with the glass bottom at the end of the overblow B, the apertures $b'$ $b'$ providing for the exit of the air within the lamp, which is forced out by the entrance of the plunger D. The purpose of causing the central tube to unite with the base of the overblow B is to steady the tube and to preserve its concentricity with the fount when the plunger is removed from the mold, because the contraction of the tube around the plunger, owing to the cooling of the glass, may necessitate turning the plunger in withdrawing it. This might produce a displacement of the tube. I do not, however, limit the scope of my claims to this feature, unless expressly so stated.

The disk E is adjusted on the plunger D at such a distance from the end $d'$ that its under surface will be immediately above the mold, and the edge of the flange $e^2$ will be as nearly as possible on a level with the mouth of the mold when the end $d'$ is within the overblow-chamber B, but at some distance from the flat bottom thereof.

The effect of the engagement of the annular cutter $e^2$, with the surplus glass at the top of the fount, where it joins the tube, is to cut a groove or depression around the tube, so as to practically sever the surplus glass G therefrom and to leave a well-defined circular line of fracture. When the plunger D is removed and the lamp is taken from the mold, the surplus glass may be struck off from the fount on this line. The overblow B and the end of the tube are then struck or cut off, and after the rough edges of the tube and fount have been ground the article is complete. It then presents the appearance shown in Fig. 4, and is ready for the burner and foot.

The burner-neck is screwed or otherwise fastened to the rim $a$ at the top of the fount, and a hollow foot may be likewise secured to the short projecting end $c'$ of the tube $c$ at the base of the fount, though, if desired, no foot need be used, but the article may be employed as a bracket-lamp. It will be noticed that the fount is blown upside down, the part which is uppermost in the mold forming the base of the fount, and the part lowest in the mold constituting the collar when the overblow B is knocked off. After the plunger D is removed from the tube it may be necessary to use some means to prevent the plastic glass at the top from sagging inward. This can be done by inserting a loose plug into the tube immediately after the withdrawal of the plunger.

The diameter of the annular cutter $e^2$ of the disk E is of a size corresponding with the size of the lamp. To allow the same disk to be used with lamps of different sizes, I provide it with a double face and with two flanges, $e^2$ and $e^3$, of different diameters, one at the top and the other at the bottom of the disk. By reversing the disk on the plunger the operative face of the disk may be changed to present either cutter.

I have reduced my invention to practice and find that the lamps produced thereby are strong, so that they may be used without danger, and that they are of uniform size, so that there is no difficulty in fitting the burners. The cost of the manufacture of lamps in this way is small and very much less than the cost of the central-draft lamps now commonly used, in which the air-tubes are made of metal.

I claim—

1. An improvement in the art of making central-draft lamps, which consists in forming the body or fount of the lamp, and subsequently pressing a draft-tube into the fount while the latter is hot, whereby the fount and tube are made integral, substantially as and for the purposes described.

2. An improvement in the art of making central-draft lamps, which consists in first blowing the fount, then placing plastic glass on the blowover of the fount while the latter is hot and pressing it downward through the fount into tube form, substantially as and for the purposes described.

3. An improvement in the art of making central-draft lamps, which consists in the combination of the following steps: first, blowing a fount in a mold and forming an overblow at the bottom of the mold, and then pressing plastic glass from the overblow at the top of the mold through the fount and causing it to adhere to the overblow at the bottom, and finally removing the last-named overblow, substantially as and for the purposes described.

4. An improvement in the art of making central-draft lamps, which consists in the combination of the following steps: first, blowing a fount in a mold and forming a perforated overblow at the bottom of the mold, and then pressing plastic glass from the overblow at the top of the mold through the fount and causing it to adhere to the overblow at the bottom, and finally removing the last-named overblow, substantially as and for the purposes described.

5. An improvement in the art of making central-draft lamps, which consists in the combination of the following steps: first, blowing a fount in a mold, then placing plastic glass upon the blow-over of the fount while the latter is hot and pressing it downward through the fount, and finally cutting the surplus glass, substantially as and for the purposes described.

In testimony whereof I have hereunto set my hand this 16th day of November, A. D. 1886.

GEORGE S. SCHUCHMAN.

Witnesses:
THOMAS W. BAKEWELL,
JNO. K. SMITH.